United States Patent
Chen et al.

(10) Patent No.: US 12,024,675 B2
(45) Date of Patent: Jul. 2, 2024

(54) CORROSION INHIBITOR

(71) Applicant: Cameron International Corporation, Houston, TX (US)

(72) Inventors: Yiyan Chen, Sugar Land, TX (US); William Brett Cardwell, Spring, TX (US); Alyn Jenkins, Aberdeen (GB)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 25 days.

(21) Appl. No.: 17/757,757

(22) PCT Filed: Dec. 18, 2020

(86) PCT No.: PCT/US2020/065900
§ 371 (c)(1),
(2) Date: Jun. 20, 2022

(87) PCT Pub. No.: WO2021/127366
PCT Pub. Date: Jun. 24, 2021

(65) Prior Publication Data
US 2023/0130247 A1    Apr. 27, 2023

Related U.S. Application Data

(60) Provisional application No. 62/951,579, filed on Dec. 20, 2019, provisional application No. 62/951,610, filed on Dec. 20, 2019.

(51) Int. Cl.
| | | |
|---|---|---|
| C09K 8/54 | (2006.01) | |
| C09K 8/74 | (2006.01) | |
| C23F 11/12 | (2006.01) | |
| C23F 11/14 | (2006.01) | |
| C23F 11/16 | (2006.01) | |
| E21B 37/06 | (2006.01) | |

(52) U.S. Cl.
CPC .......... *C09K 8/54* (2013.01); *C09K 8/74* (2013.01); *C23F 11/122* (2013.01); *C23F 11/149* (2013.01); *C23F 11/16* (2013.01); *E21B 37/06* (2013.01); *C09K 2208/32* (2013.01)

(58) Field of Classification Search
CPC ....... C09K 8/54; C09K 2208/32; C23F 11/16; Y10S 507/939
See application file for complete search history.

(56) References Cited

U.S. PATENT DOCUMENTS

| | | | |
|---|---|---|---|
| 3,779,935 A | 12/1973 | McDougall et al. | |
| 3,802,890 A * | 4/1974 | Keeney | C23G 1/06 510/253 |
| 4,498,997 A | 2/1985 | Walker | |
| 5,182,013 A * | 1/1993 | Petersen | C10G 7/10 208/348 |
| H1147 H * | 3/1993 | Kennelley | 507/939 |
| 2001/0034389 A1 | 10/2001 | Vasseur | |
| 2008/0227668 A1 | 9/2008 | Welton | |
| 2011/0028360 A1 | 2/2011 | Jenkins | |
| 2011/0296746 A1 * | 12/2011 | Hernandez Altamirano | C10L 1/2222 562/571 |
| 2013/0029884 A1 * | 1/2013 | Malchesky | C09K 8/68 424/770 |
| 2013/0157919 A1 | 6/2013 | Mellies et al. | |
| 2016/0177170 A1 * | 6/2016 | Janak | C23F 11/04 507/242 |
| 2016/0185595 A1 | 6/2016 | Chen et al. | |
| 2020/0239338 A1 | 7/2020 | Moloney et al. | |

FOREIGN PATENT DOCUMENTS

| | | |
|---|---|---|
| CN | 102732891 A | 10/2012 |
| CN | 107475722 A | 12/2017 |
| JP | 2002164315 A | 6/2002 |
| WO | 2015017659 A1 | 2/2015 |
| WO | 2021127377 A1 | 6/2021 |

OTHER PUBLICATIONS

International Search Report and Written Opinion issued in PCT Application PCT/US2020/065900, dated Apr. 9, 2021 (13 pages).
International Search Report and Written Opinion issued in PCT Application PCT/US2020/065917, dated Apr. 21, 2021 (16 pages).
Wu, S. et al., "Understanding the synergistic effect of alkyl polyglucoside and potassium stannate as advanced hybrid corrosion inhibitor for alkaline aluminium-air battery", Chemical Engineering Journal, 2020 (E-pub: Oct. 14, 2019), vol. 383, Article No. 123162, Internal pp. 1-8.
Office Action issued in U.S. Appl. No. 17/757,756 dated Oct. 31, 2023, 10 pages.

* cited by examiner

*Primary Examiner* — Aiqun Li
(74) *Attorney, Agent, or Firm* — Jeffrey D. Frantz

(57) ABSTRACT

Corrosion inhibition compositions and methods useful for inhibiting corrosion are provided. The corrosion inhibition compositions comprise at least one filming agent and at least one promoting agent and the methods for inhibiting corrosion on metal surfaces utilize the disclosed corrosion inhibiting compositions.

9 Claims, No Drawings

CORROSION INHIBITOR

CROSS REFERENCE TO RELATED APPLICATION

This application is a national stage entry under 35 U.S.C. 371 of International Application No. PCT/US2020/065900, entitled "Corrosion Inhibitor", filed Dec. 18, 2020, which claims priority to and benefit of U.S. Provisional Application No. 62/951,579, entitled "Corrosion Inhibitor", filed Dec. 20, 2019 and U.S. Provisional Application No. 62/951,610, entitled "Coupling Agents for use in corrosion inhibiting compositions," filed Dec. 20, 2019, the disclosures of which are herein incorporated by reference in their entireties for all purposes.

FIELD OF THE DISCLOSURE

Embodiments disclosed herein relate generally to compositions and methods for inhibiting corrosion on metal surfaces, in particular, metal surfaces of industrial, oilfield, and/or refinery equipment and structures. In some embodiments disclosed herein, utilization and application of the compositions and methods provide enhanced or improved upstream production corrosion inhibition, downstream refinery corrosion inhibition, wellbore environment corrosion inhibition, and/or acid stimulation corrosion inhibition.

SUMMARY OF THE DISCLOSURE

In one aspect, embodiments disclosed herein relate to at least one corrosion inhibition composition comprising at least one filming agent and at least one promoting agent.

In another aspect, embodiments disclosed herein relate to at least one method of inhibiting corrosion on metal surfaces with a corrosion inhibiting composition and the at least one method comprises contacting the metal surfaces with the corrosion inhibiting composition, wherein the corrosion inhibiting composition comprises at least one filming agent, and at least one promoting agent.

In another aspect, embodiments disclosed herein relate to at least one method of treating a subterranean hydrocarbon producing formation with a corrosion inhibiting composition and the at least one method comprises contacting a subterranean zone with the corrosion inhibiting composition, wherein the corrosion inhibiting composition comprises at least one filming agent and at least one promoting agent.

In some embodiments, a corrosion inhibition composition configured to treat one or more metal surfaces is provided. The corrosion inhibition composition may comprise at least one filming agent, at least one promoting agent, and at least one solvent.

In an embodiment, the at least one filming agent may be selected from the group consisting of one or more imidazolines, one or more quinolines, one or more alkynols, one or more alkynol derivatives, and at least one combination thereof.

In an embodiment, the one or more alkynols may be selected from the group consisting of:

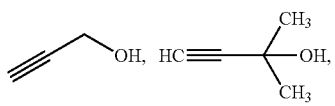

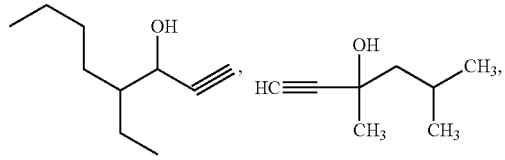

and at least one combination thereof.

In an embodiment, the one or more alkynol derivatives may comprise one or more alkynols complexed with methyloxirane.

In an embodiment, the one or more alkynols complexed with methyloxirane comprises 3,5-dimethyl-1-hexyn-3-ol.

In an embodiment, the one or more metal surfaces may be disposed within a subterranean hydrocarbon producing formation or borehole or the one or more metal surfaces may be associated with refinery equipment and structures and/or oilfield equipment and structures.

In an embodiment, the at least one promoting agent may be selected from the group consisting of one or more polysulphides, one or more thiosulfates, potassium iodide, copper iodide, and at least one combination thereof.

In an embodiment, the at least one solvent may comprise at least monoethylene glycol.

In an embodiment, the corrosion inhibition composition may further comprise at least one coupling agent.

In an embodiment, the at least one coupling agent may comprise at least one ether amine.

In other embodiments, a method of inhibiting corrosion of metal surfaces is provided. The method may comprise contacting at least one metal surface with a corrosion inhibition composition and the corrosion inhibition composition may comprise at least filming agent, at least one promoting agent, and at least one solvent.

In an embodiment, the method may further comprise at least one of introducing the corrosion inhibition composition into an overhead space comprising the at least one metal surface and pumping a matrix treatment fluid comprises the corrosion inhibition composition dissolved into an acid.

In an embodiment, the method may further comprise injecting the corrosion inhibition composition into the overhead space.

In an embodiment, the at least one filming agent may be selected from the group consisting of one or more imidazolines, one or more quinolines, one or more alkynols, one or more alkynol derivatives, and at least one combination thereof.

In an embodiment, the one or more alkynols may be selected from the group consisting of:

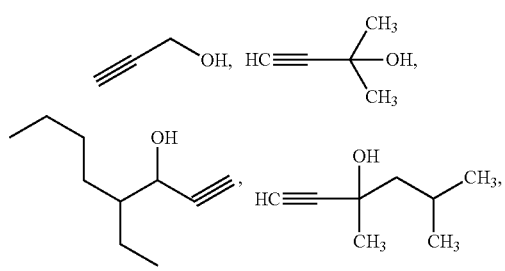

and at least one combination thereof.

In an embodiment, the one or more alkynol derivatives comprises one or more alkynols complexed with methyloxirane.

In an embodiment, the one or more alkynols complexed with methyloxirane may comprise 3,5-dimethyl-1-hexyn-3-ol.

In an embodiment, the at least one promoting agent may be selected from the group consisting of one or more polysulfides, one or more thiosulfates, potassium iodide, copper iodide, and at least one combination thereof.

In an embodiment, the at least one solvent may comprise at least monoethylene glycol.

In an embodiment, the a corrosion inhibition composition of the method may further comprise at least one coupling agent, which may comprise at least one ether amine.

In some other embodiments, a method of treating a subterranean hydrocarbon producing formation with a corrosion inhibiting composition such that corrosive effects of an acidizing composition on metal surfaces in contact therewith are reduced is provided. The method may comprising contacting a subterranean zone with the corrosion inhibiting composition and the corrosion inhibiting composition may comprise at least one filming agent, at least one promoting agent, and at least one solvent.

In an embodiment, the at least one filming agent may comprise at least one alkynol selected from the group consisting of:

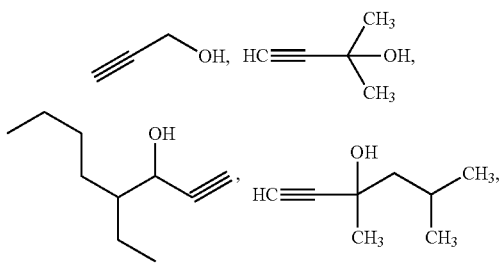

and at least one combination thereof.

In an embodiment, the at least one filming agent comprises one or more alkynols complexed with methyloxirane.

In an embodiment, the at least one promoting agent may be selected from the group consisting of one or more polysulfides, one or more thiosulfates, potassium iodide, copper iodide, and at least one combination thereof.

In further embodiments, a method of inhibiting corrosion of a metal surface is provided. The method may comprise exposing at least one metal surface to an acidic solution comprising the corrosion inhibiting compound, wherein equipment or a structure comprises the at least one metal surface exposed to the acidic solution.

In an embodiment, the equipment or the structure may be utilized in oil and gas industry.

In an embodiment, the equipment or the structure may be utilized in water industry, geothermal energy, Carbon services, or nuclear industry In still further embodiments, a method of inhibiting corrosion of at least one metal surface of a refinery system is provided. The method may comprise contacting the at least one metal surface of the refinery system with a corrosion inhibition composition comprising at least one filming agent, at least one promoting agent, and at least one solvent In an embodiment, a refinery overhead of the refinery system may comprise the at least one metal surface contacted with the corrosion inhibition composition.

In an embodiment, the method may further comprise injecting the corrosion inhibition composition into the refinery system such that the at least one metal surface contacts the injected corrosion inhibition composition.

In an embodiment, the refinery system may comprise at least one line configured for injecting the corrosion inhibition composition into the refinery system.

Other aspects and advantages will be apparent from the following description and the appended claims.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

In general, embodiments disclosed herein relate to compositions and methods for inhibiting corrosion on metal surfaces of equipment and structures and/or metal surfaces disposed within a subterranean formation or a borehole formed therein. Compositions useful for treating the metal surfaces according to embodiments disclosed herein may comprise one or more filming agents and one or more promoting agents. In some embodiments, the compositions may further comprise at least one of a solvent, a hydrotrope/coupling agent, and other useful compounds. The present compositions and methods disclosed herein generally protect the metal surfaces from corrosion and applications of the present corrosion protection depend upon where the metal surfaces may be utilized, provided and/or disposed. For example, the metal surfaces may be metal surfaces of oil and gas equipment, such as, downstream refinery equipment and/or structures and/or upstream oil and gas production equipment and/or structures. Further, the metal surfaces may be utilized during upstream stimulation, such as, matrix acidizing. During acidizing treatments, the present composition disclosed herein may be utilized because acid treatments may pass through tubing, this is metal, prior to reaching the subterranean formation. As a result, the present composition disclosed herein may protect the tubing from corrosion of the acid treatments.

The one or more filming agents comprises molecules that have affinity to attach to metal surfaces that are disposed downhole and/or metal surfaces disposed within a subterranean formation or borehole formed therein. The one or more filming agents interact with metal and/or the surfaces through physical and/or chemical absorption. The metal or the surfaces is rich in electrons and can, in cases, give or provide a very polar surface for the molecules of the one or more filming agents to interact with. In some embodiments, the one or more filming agents may be, for example, one or more quaternary amines and/or may have one or more polar portions that associate with the polar metal surface. In other embodiments, the molecules of the one or more filming agents may be, for example, quinolinium molecules and/or may have an extensive conjugated π electrons system that is also attractive to the electron rich metal surface by sharing electrons. The one or more filming agents may also have at least one non-polar portion that helps expel water once a protective and/or corrosion inhibiting film is created via the one or more filming agents. The one or more filming agents may be a single species or multiple species. In some embodiments, the one or more filming agents disclosed herein provide or achieve synergistic behavior when using at least two filming agents of the one or more filming agents.

The one or more filming agents of the present disclosure may be selected from the group consisting of one or more imidazolines, one or more quinolines, one or more alkynols, one or more alkynol derivatives, and at least one combination thereof. In an embodiment, the one or more filming agent may comprise at least one quaternized quinoline. In some embodiments, the one or more alkynols and/or the one or more alkynol derivatives may comprise at least one selected from 3,5-dimethyl-1-hexyn-3-ol, 2-propyn-1-ol, 2-methyl-3-butyn-2-ol, propoxylated prop-2-yn-1-ol, ethyl-octynol, and at least one combination thereof.

The one or more filming agents of the present disclosure may provide enhanced or improved corrosion inhibition when at least two species of said group are combined. In some embodiments, the corrosion inhibitor composition may comprise the one or more alkynols and/or the one or more alkynol derivatives in combination with the one or more imidazolines and/or the one or more quinolines. In embodiments where the one or more alkynols and/or the one or more alkynol derivatives are combined with the one or more imidazolines, a ratio of the one or more alkynols and/or the one or more alkynol derivatives to the one or more imidazoline may range from about 0.5:1 to about 1.5:1 in some embodiments; from about 0.75:1 to about 1.25:1 in other embodiments; and from about 0.9:1 to about 1.2:1 in yet other embodiments. In embodiments where the one or more alkynols and/or the one or more alkynol derivatives are combined with the one or more quinolines, the ratio of the one or more alkynols and/or the one or more alkynol derivatives to the one or more quinolines may range from about 0.5:1 to about 1.5:1 in some embodiments; from about 0.75:1 to about 1.25:1 in other embodiments; and from about 0.9:1 to about 1.2:1 in yet other embodiments.

Where the one or more filming agents comprises the one or more alkynols, the one or more filming agents is at least one alkynol selected from the group consisting of:

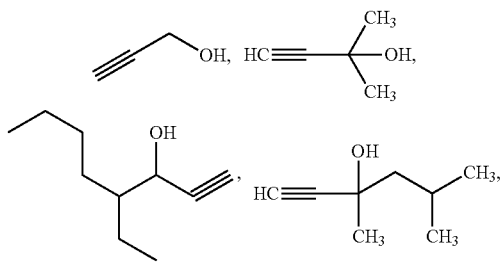

and at least one combination thereof. Where the one or more filming agents comprises the one or more alkynol derivatives, the one or more filming agents comprises one or more alkynols complexed with methyloxirane. For example, one or more alkynols complexed with methyloxirane may be 3,5-dimethyl-1-hexyn-3-ol.

Since application of the corrosion inhibitor composition is normally in an aqueous media, proper balancing the hydrophilicity and lipophilicity is at least important, if not critical. If the molecule of the one or more filming agents is too hydrophilic, the molecule will dissolve in water and there is not driving force to have the molecule associate to the metal surface or the molecule can be easily washed off even if the molecule may initially associate with the metal. If the molecule of the one or more filming agents is too hydrophobic, although the molecule will associate with the metal tightly once in contact, but it will be difficult for the molecule to be dispersed in the aqueous media to get a chance or opportunity to see the metal or to associate the metal.

To best achieve this amphiphilic balance, one or more proper solvent combinations and/or one or more hydrotrope/coupling agents (hereinafter "one or more coupling agents") may be utilized or incorporated into the corrosion inhibitor composition. At least one proper solvent combination may be important for creating at least one concentrate package that may allow the one or more filming agents to be easily delivered to the application media. It has limited contribution to change the solvency of the media since its concentration in the application media is usually low. In embodiments, the one or more solvents of the solvent combination may be at least one solvent selected from the group consisting of ethylene glycol monobutyl ether (hereinafter "EGMBE"), monoethylene glycol (hereinafter "MEG"), an aromatic fluid-based solvent, methanol, water, and at least one combination thereof. For example, the at least one solvent may be MEG.

The one or more coupling agents on the other hand, may help significantly or substantially adjust the amphiphilic nature of the one or more filming agents and/or may be more versatile than the solvent adjustment. The one or more coupling agents disclosed herein are of amphiphilc nature of themselves but should not be simply regarded as surfactants because the one or more coupling agents are more balanced in HLB than the surfactants and/or do not necessarily have strong ability in lowering the surface/interface tension. In embodiments, the one or more coupling agents may also have an ability to associate with the one or more filming agents to modify those molecules' behavior. The hydrophilic group functionality may also play at least one important or substantial role.

In embodiments, the one or more coupling agents of the present disclosure may comprise one or more ether amines, one or more ether amine oxides, and at least one combination thereof. The one or more ether amines may be one or more ether quaternary amines selected from the group consisting of isodecyloxypropyl bis-(2-hydroxyethyl) methyl ammonium chloride, isotridecyloxypropyl bis-(2-hydroxyethyl) methyl ammonium chloride, mono soya methyl ammonium chloride, tallow diamine diquaternary, coco poly(15) oxyethylene methyl ammonium chloride, and at least one combination thereof. The one or more ether amine oxides may be selected from the group consisting of his-(2-hydroxyethyl) isodecyloxypropylamine oxide, linear alkyloxypropylamine oxide, low-foam alkyloxypropylamine oxide, and at least one combination thereof. In some embodiments, the one or more coupling agents may be at least one selected from at least one alkyl imino propionic acid, at least one ethoxylated alcohol, at least one alky polysaccharide, and at least one combination thereof. Further, the at least one alkyl imino propionic acid may comprise an alkyl group directly linked to the amine or an alkyl group indirectly linked to the amine via at least one ether spacer therebetween.

In addition to the one or more filming agents and/or the one or more coupling agents, one or more promoting agents may also be utilized to boost or enhance the performances of the corrosion inhibitor composition. The one or more promoting agents may modify the metal surface to make it more attractive to the molecules of the one or more filming agents. In some embodiments, the one or more promoting agents may join with the one or more filming agents or catalyze the molecules of the one or more filming agents to form a more robust protective film. The one or more promoting agents of the present disclosure are selected from the group consisting of potassium iodide, copper iodide, thiosulfates, polysulfides, and at least one combination thereof.

The corrosion inhibitor compositions disclosed herein may be contacted with, applied to, and/or disposed on metal surfaces of metal equipment and/or structures associated with one or more upstream production applications, one or more downstream refinery applications, one or more acid stimulation applications, and/or one or more subterranean formation or wellbore applications. In some embodiments, the corrosion inhibitor compositions disclosed herein may be contacted with, applied to, and/or disposed on one or more metal surfaces, such as in refinery distill towers as well as to inhibit corrosion from forming in downhole equipment and/or environments. As a result, the present corrosion inhibitor compositions disclosed herein may provide corrosion inhibition to protect refinery overhead equipment and components, other refinery equipment as well as downhole or wellbore equipment, structures, and/or environments. In embodiments, the present methods of treating a subterranean hydrocarbon producing formation with the corrosion inhibitor composition disclosed herein may comprise contacting the subterranean producing formation with the corrosion inhibitor composition comprising the one or more filming agents and the one or more promoting agents. In some embodiments, the corrosion inhibition composition may be injected into an overhead space with an atomized sprayer and/or a matrix treatment fluid comprise the corrosion inhibition composition dissolved into an acid may be pumped or introduced into the subterranean formation.

In embodiments, an acid and/or acid solution (hereinafter "the acid solution") comprising the present corrosion inhibitor composition disclosed herein may be pumped into a wellbore formed within a formation to remove near-well formation damage and other damaging substances. The pumping of the acid solution into the wellbore may enhance production by increasing the effective well radius. When the acid solution is pumped into the wellbore at pressures above the pressure required to fracture the formation, acid fracturing of the formation may occur.

In one example, a reservoir formation may be treated with a stimulation fluid comprising at least one reactive acid and the present corrosive inhibitor composition disclosed herein. As a result, the at least one reactive acid may react with the soluble substances in the formation matrix to enlarge the pore spaces and/or dissolve the entire formation matrix. Further, matrix acidizing treatment of the reservoir formation may improve the formation permeability to enable enhanced production of reservoir fluids. Matrix acidizing operations may be performed at high rate, but at treatment pressures below the fracture pressure of the formation. As a result, the at least one reactive acid may penetrate the reservoir formation and/or extend the depth of treatment while avoiding damage to the reservoir formation.

In some embodiments, a subterranean hydrocarbon producing formation may be treated with the acid solution to stimulate production during a matrix acidizing operation. The matrix acidizing operation involves deliberate exposure of borehole steel to acid. In an embodiment, the matrix acidizing operation may be performed with coiled tubing, which is run into a borehole and then used to convey acid down the borehole to the formation. When the matrix acidizing operation comes to an end, the steel casing in the borehole and the exterior of the coiled tubing may be exposed to so-called unspent acid flowing back with formation fluids that flow back towards the surface. For example, in the oil industry and in matrix acidizing operations, the corrosion inhibitor compositions disclosed herein may work as efficient acid inhibitors downhole, and then the present corrosion inhibitor compositions may become insoluble in spent acid and formation brine when fluids flow back to the surface which may result in substantially zero or about zero aquatic toxicity.

In some other embodiments, a concentration or dosage of the corrosion inhibitor composition disclosed herein may be added to a corrosive fluid. Physico-chemical properties of the corrosive fluid may vary according to the application and prevailing wellbore and reservoir conditions. The corrosive fluid may comprise (i) a treatment fluid injected from the surface via the wellbore into the formation such as a matrix acidizing fluid or an acid fracturing fluid, (ii) a fluid injected into the reservoir to improve or enhance the recovery of hydrocarbons (i.e., IOR/EOR applications), or (iii) produced fluids (multiphase) flowing from the reservoir to the surface via the wellbore. Such injection and production operations expose a broad range of tubing, casing and downhole equipment to a wide range of different corrosive fluid compositions. The tubing, casing, and/or downhole equipment may be composed of carbon steels and/or low and high alloys. Exposure times vary from a few hours in the case of low volume matrix acidizing stimulation treatments to months or years in the case of reservoir conformance fluids and produced fluids. The efficiency of the present corrosion inhibitor compositions depends on the composition and microstructure of the metal or alloy substrate. Details pertaining to any given application dictate the nature of the exposed metal/alloy type(s), the composition and properties of the corrosive fluid, the range of exposure times and the prevailing physico-chemical conditions including temperature, pressure, oxygen concentration, and the presence and concentration of acid gases, $CO_2$, and $H_2S$.

In embodiments, one or more methods for refinery corrosion inhibition may comprise contacting one or more metal surface of a refinery system with at least one corrosion inhibitor composition disclosed herein. For example, the corrosion inhibitor composition disclosed herein may be injected into the refinery system such that the corrosion inhibitor composition contacts at least one metal surface of the refinery system. In embodiments, the refinery system may comprise equipment and/or one or more structures and the equipment and/or the one or more structures may comprise the at least one metal surface contacted by the corrosion inhibitor composition. In some embodiments, the equipment and/or the one or more structures may comprise refinery overheads and/or other refinery equipment. Further, the corrosion inhibitor composition may be injected into and/or disposed within the refinery system or the refinery overheads such that the corrosion inhibitor composition contacts the at least one metal surface. For example, at least one line in fluid communication with the refinery system may facilitate injection of the corrosion inhibitor composition into the refinery system or the refinery overheads. In an embodiment, at least one overhead vapor line of the refinery system may facilitate injection of the corrosion inhibitor composition into the refinery overheads of the refinery system.

One or more corrosion inhibitor packages disclosed herein are utilized in the above-mentioned applications as well as other applications under similar, or substantially similar, conditions as the conditions of the above-mentioned applications. The present one or more corrosion inhibitor packages disclosed herein may comprise at least one of the one or more filming agents, the one or more promoting agent, the one or more solvents, the one or more coupling agents, and at least one combination thereof. In embodiments, the corrosion inhibitor compositions disclosed herein may be corrosion inhibited acidizing compositions or one or more acidic solutions that may comprise the corrosion inhibitor compositions disclosed herein.

EXAMPLES

Various corrosion inhibited acidizing compositions, according to embodiments disclosed herein, were tested for corrosivity with respect to refinery applications. Although the tests presented herein are designed to simulate refinery applications, it is believed that the inhibition effectiveness also applies to matrix acidizing and other acid environment. The utilized test methods and the test results for the tests presented herein are as follows.

A 3% NaCl aqueous solution with 100 ppm HCl is used as the testing fluid. This fluid has a pH of ~2 and a significant amount of electrolyte which is very close to that appeared in the overhead. To exclude oxygen and create a relatively inner atmosphere, a stream of $CO_2$ was bubbled through the liquid at all time. Although the ionic dew point is higher than the water dew point, it is still within a few degrees of water dew point. Therefore, for the ease of experiments, the boiling point of the aqueous media is selected as the test temperature so that the temperature is stabilized with reflux. The boiling temperature is slightly higher than 100° C. due to the dissolved electrolytes. The aqueous media in this case is very close to that of the overhead after the ionic dew point yet before that water dew point, i.e. the most severe corrosion condition.

The experimental setup included a culture vessel with magnetic stir and condenser, a Teflon stand, glass rods, glass hooks, and carbon steel coupons. The culture vessel was filled to half way (500 mL) with the aqueous solution of 3% NaCl and 100 ppm HCl. A coupon was hung from the lowest glass hook, which is immersed in the liquid media. A second coupon was hung on the top glass hook to be exposed in the vapor phase. All examples included herein are based on C1018 carbon steel coupons. Unless pointed out otherwise, the tests results reported in this disclosure are all based on this experiment method. The examples were generally run for 4 hours at 100° C. unless otherwise mentioned.

Example 1. Synergistic Effect Between Imidazoline Compound and Alkynol Derivatives A number of alkynol and alkynol derivatives were tested for corrosion inhibition when combined with an imidazoline, with results provided in Table 1. In embodiments, the alkynols are Basocorr products and MBI products, commercially available from BASF; and/or the alkynol derivate is Surfynol 61, commercially available from Evonik. In an embodiment, the imidazoline is DETPET 2, commercially available from SPT. The test media is aqueous solution containing 3% NaCl and 100 ppm of HCl. The corrosion inhibitor used are 50 ppm imidazoline, 50 ppm alkynol products, 1 ppm copper iodide and 1 ppm potassium iodide. It can be seen from the result that most alkynol derivatives contribute somewhat to reduce the corrosion rate, with 3,5-dimethyl-1-hexyn-3-ol being the best performer.

TABLE 1

Effect of different alkynols on corrosion inhibitor performances

| Filming Agent 1 | Filming Agent 2 | Promoting Agents | Corrosion rate, mpy |
|---|---|---|---|
| Imidazoline (50 ppm) | None | CuI (1 ppm); KI (1 ppm) | 85 |
| Imidazoline (50 ppm) | 3,5-dimethyl-1-hexyn-3-ol (50 ppm) | CuI (1 ppm); KI (1 ppm) | 32 |
| Imidazoline (50 ppm) | 2-Propyn-1-ol (50 ppm) | CuI (1 ppm); KI (1 ppm) | 83 |
| Imidazoline (50 ppm) | 2-methyl-3-butyn-2-ol (50 ppm) | CuI (1 ppm); KI (1 ppm) | 67 |
| Imidazoline (50 ppm) | propoxylated prop-2-yn-1-ol (50 ppm) | CuI (1 ppm); KI (1 ppm) | 61 |
| Imidazoline (50 ppm) | propoxylated prop-2-yn-1-ol (50 ppm) | CuI (1 ppm); KI (1 ppm) | 37 |

Example 2. Synergistic Effect Between Quinoline Compound and Alkynol Derivatives Similar effect is also observed when alkynols are used in conjunction with quinoline compounds. The filming agent is quaternized quinoline, such as, for example, Alpha 1038, commercially available from Lubrizol. Table 2 provides the formulations of three corrosion inhibitor packages and their corrosion rates. Instead of using a culture vessel, the test was performed at 100° C. for 4 hours with sealed bottles that contained 1% HCl and 3% NaCl. In all tests, 500 ppm active filming agent was used. RFCI-151 has 500 ppm of quaternized quinoline and 3,5-dimethyl-1-hexyn-3-ol combined, the RFCI-151 package loading in the corrosion inhibitor package is 1500 ppm. In this comparison, propoxylated prop-2-yn-1-ol did not show any synergistic behavior while 3,5-dimethyl hexyn-3-ol significantly enhanced the package inhibition performance.

embodiment, the ethoxylated alcohol may be Multitrope 1620, commercially available from Croda. In this set of comparisons, the inhibitor packages are added to give 100 ppm filming agents (imidazoline and 3,5-dimethyl-1-hexyn-3-ol) concentration. The package has the following formulation: 31.6% imidazoline, 26.3% 3,5-dimethyl-1-hexyn-3-ol, 0.5% CuI, 0.5% KI, 20.0% acetonitrile, 21.1% Solvesso 150 ND aromatic solvent. Various amounts of ethoxylated

TABLE 2

Corrosion rates of packages contains quinoline and alkynols

| Corrosion Package | Filming Agent 1 quaternised quinoline | Filming Agent 2 | | Promoting Agent KI | Formamide Formamide | Solvent 1 MEG* | Solvent 2 EGMBE** | Filming Agents 1 + 2 Concentration | Corrosion rate, mpy |
| --- | --- | --- | --- | --- | --- | --- | --- | --- | --- |
| | | 3,5-dimethyl-1-hexyn-3-ol | propoxylated prop-2-yn-1-ol | | | | | | |
| RFCI-148 | 30.0% | | | 1.5% | 19.6% | 32.7% | 13.1% | 500 ppm | 239 |
| RFCI-151 | 19.6% | 13.7% | | 1.5% | 19.6% | 32.7% | 13.1% | 500 ppm | 83 |
| RFCI-152 | 19.6% | | 13.7% | 1.5% | 19.6% | 32.7% | 13.1% | 500 ppm | 287 |

*Monoethylene glycol
**Ethylene glycol monobutyl ether

Example 3. Effect of Coupling Agent on Corrosion Inhibitor Performances

Although the filming agent is the one acting as the corrosion inhibition film in the inhibitor package, properly balancing the package affinity is also critical to achieve good corrosion inhibition performances. A hydrotropic coupling agent was used to achieve this goal. Table 3 demonstrated the significant impact of the coupling agent on the corrosion inhibitor performances. Coupling agents suitable to enhance the corrosion inhibition include ether amines. The coupling agent used was alkyl imino propionic acid with an alkyl group indirectly linked to the amine via an ether spacer therebetween. In embodiments, the alky imino propionic acid is Tomamine Amphoteric 12 Surfactant, commercially available from Evonik. The test is performed with the culture vessel setup described previously. Both tests contain the same amount of filming agent (quaternised quinoline and 3,5-dimethyl-1-hexyn-3-ol total to 100 ppm concentration, KI and formamide are used as inhibitor promoters, and MEG/EGMBE mixed solvents are used as packaging solvents). As it can be seen from the table, 39 ppm of alkyl imino propionic acid having indirectly linked alkyl hydrotrope improved the corrosion inhibitor protection by an order of magnitude. It is worth mentioning that alkyl imino propionic acid having indirectly linked alkyl product alone does not provide any corrosion inhibition from a separate experiment. It confirms the function of this chemical in the inhibition performance.

TABLE 3

Effect of alkyl imino propionic acid having indirectly linked alkyl on corrosion inhibitor performance

| ID | Hydrotrope | Corrosion rate, mpy |
| --- | --- | --- |
| RFCI-151 | none | 328 |
| RFCI-169 | 39 ppm | 29 |

Example 4. Hydrotrope Effect on Corrosion Inhibition

Table 4 shows another example of the effect of a hydrotrope, such as, for example, ethoxylated alcohol. In an alcohol were added to test its effect. As can be seen from Table 4, ethoxylated alcohol gradually improves the corrosion inhibitor performances to a certain extend then plateaued off. In addition, since the components in this inhibitor package are not well soluble in the solvent package, the addition of hydrotrope also helped to keep the solution in homogeneity for an extended period of time.

TABLE 4

Effect of different loading of Ethoxylated alcohol hydrotrope on corrosion rate

| ID | Alkyl polysaccharide, ppm | Corrosion rate, mpy |
| --- | --- | --- |
| RFCI-92 | 0 | 72 |
| RFCI-100 | 6.05 | 63 |
| RFCI-101 | 38.70 | 47 |
| RFCI-102 | 62.40 | 40 |
| RFCI-103 | 86.30 | 42 |

Example 5. Various Hydrotropes Effects when Used with Alkynol Derivative and Quinoline Filming Agents Various hydrotropes can be used to improve the performances of corrosion inhibitor packages with alkynol derivative and quinoline filming agents. Table 5 shows the effect on corrosion rates of 6 different hydrotropes used with the same base corrosion. The base inhibitor package concentrations are the same for all tests at 360 ppm (active filmer quaternised quinoline and propoxylated prop-2-yn-1-ol total to 100 ppm). Optimization experiments (results not shown here) were run prior to select specific loading for each hydrotrope shown in Table 6.

TABLE 5

Base corrosion inhibitor package for example 5.

| | Chemical | | | | |
|---|---|---|---|---|---|
| Quaternised quinoline | Propoxylated prop-2-yn-1-ol | KI | Formamide | Methanol | IPA |
| Concentration 16.30% | 11.41% | 1.09% | 32.6% | 19.00% | 19.00% |

TABLE 6

Effects of various hydrotropes on corrosion inhibitor performances for example 5.

| Hydrotrope | Concentration, ppm | Corrosion rate, mpy |
|---|---|---|
| alkyl polysaccharide | 15.7 | 202 |
| ethoxylated alcohol | 25.1 | 78 |
| alkyl imino propionic acid having directly linked alkyl | 9.8 | 328 |
| alkyl imino propionic acid having directly linked alkyl | 51.0 | 43 |
| first ethoxylated alcohol | 9.8 | 93 |
| second ethoxylated alcohol | 15.7 | 93 |

Example 6. Various Hydrotropes Effects when Used with Alkynol Derivatives and Quinoline Filming Agents Similarly, various hydrotropes were also used to improve the performances of corrosion inhibitor packages with 3,5-dimethyl-1-hexyn-3-ol and quinoline filming agents. Example 6 showed the effect on corrosion rates of 6 different hydrotropes used with the same base corrosion package shown in Table 7. The base inhibitor package concentrations are the same for all tests at 260 ppm (active filmer quaternised quinoline and 3,5-dimethyl-1-hexyn-3-ol total to 100 ppm). Optimization experiments (results not shown here) were run prior to select specific loading for each hydrotrope shown in Table 8. It is clear from the table that the effectiveness of different hydrotrope are not the same. For the best performance, experiments should be performed to select the most effective hydrotrope for the corrosion inhibitor package. Comparing results of example 5 and 6, it is also obvious that when the composition of the filming agents changes, the hydrotrope also need to be reformulated to give the best performance.

TABLE 7

Base corrosion inhibitor package for example 6.

| | Chemical | | | | | |
|---|---|---|---|---|---|---|
| quaternised quinoline | 3,5-dimethyl-1-hexyn-3-ol | KI | Formamide | Methanol | EGMBE | Water |
| Concentration 22.56% | 15.79 | 1.50% | 22.60% | 8.00% | 22.56% | 7.52% |

TABLE 8

Effects of various hydrotropes on corrosion inhibitor performances for example 6.

| | Concentration, ppm | Corrosion rate, mpy |
|---|---|---|
| Alkyl polysaccharide | 15.7 | 288 |
| Ethoxylated alcohol | 51.0 | 366 |
| alkyl imino propionic acid having alkyl directly linked to amine | 51.0 | 58 |
| alkyl imino propionic acid having alkyl indirectly linked to amine | 25.1 | 68 |
| first ethoxylated alcohol | 51.0 | 42 |
| second ethoxylated alcohol | 25.1 | 105 |

Example 7. Effect of Solvent Package on the Corrosion Inhibitor Performances

Solvents in a concentrate corrosion inhibitor package perform multiple functions. They first help make the package stay homogeneous in storage and application. They make the package easily flowable at application temperatures. One function that can often be overlooked is that they also facilitate the filming molecules be dispersed quickly in the application media so that the film can be formed at the metal surface. Example 7 demonstrate the effect of the solvent package on the corrosion inhibitor performances. As can be seen in Table 9, both RFCI-141 and 169 have the same key ingredients and their proportions up to EGMBE. The only difference between the two packages is that RFCI-141 uses methanol/water solvent and RFCI-169 uses MEG, yet the corrosion rate reduced more than 50% when MEG is used. The solvent selection here also plays an important role in modifying the package density. Density for RFCI-141 is 0.97 g/mL, lower than water, and for RFCI-169 is 1.06, higher than water. The denser than water feature helped greatly to pull the filming molecules into the test media and helped the dispersion of filmer from the very beginning.

TABLE 9

Effect of solvent package on corrosion inhibitor performance

| ID | quaternised quinoline | 3,5-dimethyl-1-hexyn-3-ol | KI | Formamide | alkyl imino propionic acid amphoteric with indirectly linked alkyl | EGMBE | Methanol | H$_2$O | MEG | Corrosion rate, mpy |
|---|---|---|---|---|---|---|---|---|---|---|
| RFCI-141 | 20.58% | 14.40% | 1.37% | 20.6% | 8.78% | 20.58% | 7% | 6.86% | | 68 |
| RFCI-169 | 16.39% | 11.48% | 1.09% | 16.39% | 10.93% | 13.11% | | | 30.60% | 29 |

Example 8. Effect of Thiosulfate Corrosion Inhibitor Intensifier/Promoter

Corrosion inhibitor intensifiers/promoters are commonly used to boost the inhibitor's performances. In addition to many examples showed before that contains KI (some with CuI) as promoter, thiosulfate was also found to be very effective when used with certain filming molecules. Example 8 in Table 10 listed two inhibitor package formulations and their performances. These two formulations only differ in the promoter used. One can see that sodium thiosulfate works well here, improving the protection by almost an order of magnitude.

TABLE 10

Effect of thiosulfate corrosion inhibitor intensifier/promoter

| ID | quaternised quinoline | propoxylated prop-2-yn-1-ol | Formamide | MEG | EGMBE | KI | Na$_2$S$_2$O$_3$ | Corrosion rate, mpy |
|---|---|---|---|---|---|---|---|---|
| RFCI-152 | 19.61% | 13.73% | 19.61% | 32.68% | 13.07% | 1.31% | | 213 |
| RFCI-153 | 19.61% | 13.73% | 19.61% | 32.68% | 13.07% | | 1.31% | 25 |

Example 9. Polysulfide as Corrosion Inhibitor Intensifier/Promoter

It is believed that thiosulfate provide the inhibitor promotion behavior by providing low oxidation state sulfur atoms which coupled on the metal surface to make the metal more attractive to the filming molecules. Not to be limited by theory, polysulfide can also provide low oxidation state sulfur atoms. As shown in Table 11, RFCI-176 is a formulation made with potassium polysulfide as the promoting agent at the same concentration level as the sodium thiosulfate in formulation RFCI-170. The polysulfide formulation performed in par with the thiosulfate formulation at high package loadings as demonstrated in Table 12. It is worth noting that when the package loading is low, at 25 ppm active filming molecules, polysulfide formulation performed significantly better than that of thiosulfate package. It is not surprising since per weight of polysulfide provides more sulfur atoms than thiosulfate. There may also be other possibilities that the sulfur provided by polysulfide binds quicker to metal surface than thiosulfate since the oxidative state for polysulfide is closer to what is needed in forming the metal-sulfur bond. When the loading further reduced by 50%, it looks like that both formulations lost their inhibition ability which can be ascribed to lack of filming molecules.

TABLE 11

Base corrosion inhibitor package for example 9.

| ID | quaternised quinoline | 3,5-dimethyl-1-hexyn-3-ol | Formamide | MEG | EGMBE | alkyl imino propionic acid with indirectly linked alkyl | Na$_2$S$_2$O$_3$ | K$_2$Sn |
|---|---|---|---|---|---|---|---|---|
| RFCI-170 | 16.39% | 11.48% | 16.39% | 30.60% | 13.11% | 10.93% | 1.09% | |
| RFCI-176 | 16.39% | 11.48% | 16.39% | 30.60% | 13.11% | 10.93% | | 1.09% |

TABLE 12

| Performance vs. inhibitor package concentration | | | | |
|---|---|---|---|---|
| Package loading, ppm | 360 | 180 | 90 | 45 |
| Active filmer, ppm | 100 | 50 | 25 | 12.5 |
| RFCI-170 | 24 | 25 | 71 | 93 |
| RFCI-176 | 27 | 32 | 33 | 79 |

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A corrosion inhibition composition configured to treat one or more metal surfaces, the corrosion inhibition composition comprising:
   at least one filming agent comprising 3,5-dimethyl-1-hexyn-3-ol, wherein the corrosion inhibition composition comprises about 11 wt % of the at least one filming agent;
   at least one coupling agent comprising an alkyl imino propionic acid comprising an alkyl indirectly linked to an amine of the alkyl imino propionic acid via an ether spacer;
   at least one promoting agent comprising potassium polysulfide, wherein the corrosion inhibition composition comprises about 1 wt % of the at least one promoting agent; and
   at least one solvent.

2. The corrosion inhibition composition of claim 1, wherein the one or more metal surfaces are disposed within a subterranean hydrocarbon producing formation or borehole or the one or more metal surfaces are associated with refinery equipment and structures and/or oilfield equipment and structures.

3. The corrosion inhibition composition of claim 1, wherein the at least one solvent comprises at least monoethylene glycol.

4. The composition of claim 1, wherein the corrosion inhibition composition comprises 9.8 parts per million to 51 parts per million of the coupling agent.

5. A method of inhibiting corrosion of metal surfaces, the method comprising:
   contacting at least one metal surface with a corrosion inhibition composition comprising:
   at least one filming agent comprising 3,5-dimethyl-1-hexyn-3-ol, wherein the corrosion inhibition composition comprises about 11 wt. % of the at least one filming agent;
   at least one coupling agent comprising an alkyl imino propionic acid comprising an alkyl indirectly linked to an amine of the alkyl imino propionic acid via an ether spacer;
   at least one promoting agent comprising potassium polysulfide, wherein the corrosion inhibition composition comprises about 1 wt % of the at least one promoting agent;
   and at least one solvent.

6. The method of claim 5, further comprising at least one of:
   introducing the corrosion inhibition composition into an overhead space comprising the at least one metal surface; and
   pumping a matrix treatment fluid comprises the corrosion inhibition composition dissolved into an acid.

7. The method of claim 6, further comprising injecting the corrosion inhibition composition into the overhead space.

8. The method of claim 5, wherein the at least one solvent comprises at least monoethylene glycol.

9. A method of treating a subterranean hydrocarbon producing formation with a corrosion inhibiting composition such that corrosive effects of an acidizing composition on metal surfaces in contact therewith are reduced, comprising: contacting a subterranean zone with the corrosion inhibiting composition comprising:
   at least one filming agent comprising 3,5-dimethyl-1-hexyn-3-ol, wherein the corrosion inhibition composition comprises about 11 wt. % of the at least one filming agent;
   at least one coupling agent comprising an alkyl imino propionic acid comprising an alkyl indirectly linked to an amine of the alkyl imino propionic acid via an ether spacer;
   at least one promoting agent comprising potassium. polysulfide, wherein the corrosion inhibition composition comprises about 1 wt % of the at least one promoting agent;
   and at least one solvent.

* * * * *